(12) United States Patent
Teichmann et al.

(10) Patent No.: US 8,793,272 B2
(45) Date of Patent: Jul. 29, 2014

(54) QUERY TRANSFORMATION

(75) Inventors: Jan Teichmann, Neustadt/Weinstrasse (DE); Jens Weiler, Weingarten (DE); Michael Brombach, Leimen (DE); Marcel Hermanns, Heidelberg (DE); Thomas Gauweiler, Speyer (DE); Ivo Vollrath, Waghaeusel (DE)

(73) Assignee: SAP AG, Walldorf (DE)

( * ) Notice: Subject to any disclaimer, the term of this patent is extended or adjusted under 35 U.S.C. 154(b) by 438 days.

(21) Appl. No.: 12/979,251

(22) Filed: Dec. 27, 2010

(65) Prior Publication Data

US 2012/0166465 A1    Jun. 28, 2012

(51) Int. Cl.
*G06F 17/30*    (2006.01)

(52) U.S. Cl.
USPC ............................ 707/769; 707/802; 707/706

(58) Field of Classification Search
USPC .................................. 707/759, 706, 769, 765
See application file for complete search history.

(56) References Cited

U.S. PATENT DOCUMENTS

2008/0016041 A1*    1/2008    Frost et al. ...................... 707/3

OTHER PUBLICATIONS

SAP List Viewer (ALV), created by SAP on Aug. 24, 2009, <http://scn.sap.com/docs/DOC-8637>, downloaded from the Internet on Feb. 26, 2014.

* cited by examiner

*Primary Examiner* — Cheryl Lewis
(74) *Attorney, Agent, or Firm* — Mintz Levin Cohn Ferris Glovsky and Popeo, P.C.

(57) ABSTRACT

Methods and apparatus, including computer program products, are provided for providing value help. In one aspect, there is provided a computer-implemented method. The method may include receiving at least one field of a row of a list presented at a user interface; transforming, at a service component rather than the user interface, the at least one field into a query; and sending the transformed query to a database. Related apparatus, systems, methods, and articles are also described.

19 Claims, 6 Drawing Sheets

Sales Orders

Show | My Open Orders ▼ | and Find [    ] [Go]

Group By | None ▼ | Edit New ▾ | Export ▾ | Copy | Delete | Follow-Up ▾ | Confirm Execution | Actions ▾

⟲ Advanced

| Status | Sales Order ID | External Reference | Account | Posting Date | Requested Case | Total |
|---|---|---|---|---|---|---|
| | | | | 2010 | | |
| In Preparation | 941 | EXCEL-65 | Silverstar Wholesale Corp | 15.12 2010 | 17.12 2010 | 13.458 06 USD |
| Open | 910 | COLLE | Silverstar Wholesale Corp | 15.12 2010 | 16. 2 2010 | 359.60 USD |
| In Preparation | 909 | EXCEL-65 | Silverstar Wholesale Corp | 15.12 2010 | 17.12 2010 | 13.458 06 USD |
| In Preparation | 914 | EXCEL-65 | Silverstar Wholesale Corp | 15.12 2010 | 17.12 2010 | 13.458 06 USD |
| In Preparation | 840 | EXCEL-70 | Silverstar Wholesale Corp | 15.12 2010 | 17.12 2010 | 13.458 06 USD |
| In Preparation | 908 | EXCEL-70 | Silverstar Wholesale Corp | 15.12 2010 | 17.12 2010 | 13.458 06 USD |
| In Preparation | 928 | EXCEL-60 | Silverstar Wholesale Corp | 15.12 2010 | 17.12 2010 | 13.458 06 USD |
| In Preparation | 927 | EXCEL-65 | Silverstar Wholesale Corp | 15.12 2010 | 17.12 2010 | 13.458 06 USD |
| In Preparation | 934 | | Silverstar Wholesale Corp | 15.12 2010 | 17.12 2010 | 13.458 06 USD |
| In Preparation | 933 | EXCEL-65 | Silverstar Wholesale Corp | 15.12 2010 | 17.12 2010 | 13.458 06 USD |

FIG. 1B

QUERY TRANSFORMATION

FIELD

The present disclosure generally relates to data processing.

BACKGROUND

A user interface may be defined by a user interface model, which typically includes a plurality of user interface elements. A user interface element defines an aspect of the user interface, so that at the run time of the user interface the element is presented or provides a behavior (e.g., a function, a query, a conversion, and the like). The user interface element may include a list viewer. The list viewer may handle tabular data in the form of lists, such as work lists. An example of a list viewer is the SAP List Viewer (ALV) commercially available from SAP, AG (Walldorf, Germany). The list viewer enables creating tabular data, viewing tabular data, editing tabular data, and/or other functions (e.g., exporting data to a given format, data sorts, grouping data, and other functions typically found in spreadsheets). For example, the list viewer may include a list of work items implemented as an object work list, which is a query-driven work list (e.g., some of the items on the list may correspond to items which can be obtained/queried from a database) assembled so that a user can work on a defined set of items in the work list.

SUMMARY

The subject matter disclosed herein provides methods and apparatus, including computer program products, for transforming a field of a list into a query of a database.

In one aspect, there is provided a computer-implemented method. The method may include receiving at least one field of a row of a list presented at a user interface; transforming, at a service component rather than the user interface, the at least one field into a query; and sending the transformed query to a database. Aspects also include related apparatus, systems, and articles.

In some implementations, the above-noted aspects may further include additional features described herein including one or more of the following. The at least one field may represent an action to be performed on the list. The action may include at least one of a filtering, a querying, a selecting, a sorting, a grouping, and an aggregating. The transforming may be based on a model and may transform the at least one field into the query. The model may include a mapping between the at least one field and the query. The service component may include a user input transformer configured to receive the row including the at least one field and to parse the at least one field. The service component may further include a query transformer configured to receive the parsed at least one field from the user input transformer and to generate, based on a model, a statement for execution by the database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,

FIG. 1B depicts a list including an element of the list requiring transformation;

Figure 1A:
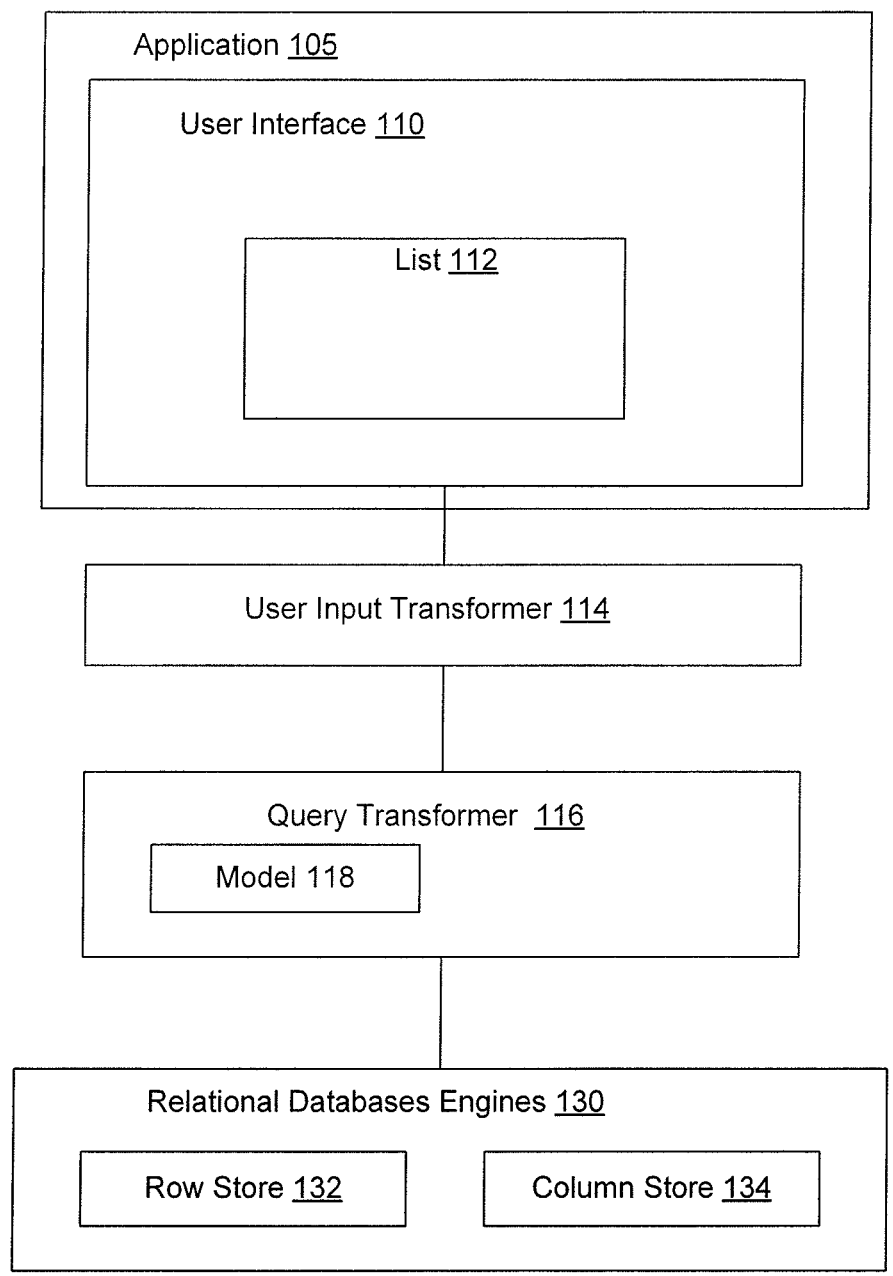
FIG. 1A depicts a block diagram of an example of a system for query transformation.

Like labels are used to refer to same or similar items in the drawings.

DETAILED DESCRIPTION

The subject matter described herein relates to transforming at least one field of a list into a query. For example, a user interface may include a list viewer element including the list, in which at least one of the rows includes a field requiring an action, such as selecting, paging, sorting, grouping, aggregating, and the like. The action(s) corresponding to the field at a row of the list are converted into a database query before being sent to the database for execution. For example, the list may include a row having a filter and/or a sort by date field, such that the sort or the filter requires a query of the database to provide data for presentation at the list.

FIG. 1A depicts a system 100 including an application 105, a user interface 110, a list 112, a user input transformer 114, a query transformer 116, and relational database engines 130, which further include a row store 132 and a column store 134.

The application 105 may be implemented as a client application including a user interface 110. For example, the application 105 may be configured as an application configured to access relational database engines 130.

The user interface 110 may be implemented as model-based user interface. For example, a model may define the user interface elements of the user interface and may include metadata to enable such definition. The model may thus allow the user interface to be present and/or handle data accessed via database 130. Moreover, the metadata of the user interface model may define the query language used to make queries from the user interface 110 to the relational database engines 130. In addition, the metadata of the user interface may define how to map and/or convert elements from a row of the list 112 into a query and/or transform/map elements before being sent to the database engines 130.

Moreover, the user interface 110 may include list 112. The list 112 may be implemented as a list viewer defined by the user interface model (which includes metadata describing for example list 112). For example, the list 112 may include a plurality of rows having fields which corresponding to data items, such as business object data stored in database 130. A business object refers to a data structure including at least one data and method organized to perform a business function/task, such as a sales order, a purchase order, etc. The fields may also correspond to actions, such as a filter, a sort, and the like, to be performed on data to be presented at the list.

To further illustrate, the rows of list 112 may be sorted based on a date field in the list 112 and filtered based on the date information. When that is the case, the sort is converted into a database query statement that queries the database 130 for the appropriate data to present in the list 112 and then the corresponding results are filtered based on the date information. The query statement may be required as a result of a sort and filter because the list 112 may only present a portion of the data, and, as a result, a sort/filter may change which subset of data is presented at list 112. Moreover, the query statement may result in the presentation at list 112 of more recent information.

The user input transformer 114 may receive at least one row of list 112. For example, each row of list 112 may be transformed by the user input transformer 114. The user input transformer 114 may perform checks to validate the form of the rows of list 112. Moreover, the user input transformer 114 may determine which fields of list 112 correspond to an action to be performed on the data at list 112, and then the user input transformer 114 parses those portions from the received row. For example, the user input transformer 112 may determine that a row includes an action, such as a selection, a sort, and the like, requiring a query of relational database 130. The user input transformer 114 may also convert the row into another form, such as an ABAP compatible list viewer format.

The query transformer 116 may transform the fields of the row into a query. For example, the fields of the table 112 may be mapped into database tables of relational database engines 130, and formed into a query statement of the corresponding database tables. For example, in some implementations, the model 118 includes metadata describing how to convert fields in a row into a query. The query transformer 116 may also route the formed query to relational database engines 130. In implementations having the input transformer 114 and query transformer 116 in a processor other than the processor hosting the application 105, the transformation of row fields into a query at the query transformer 116 removes the processing burden from the user interface 110.

The relational database engines 130 receive the query formed by query transformer 116 and returns a result set to the list 112. In some implementations, the relational database engines 130 may return the result set, without any state information being retained for the query at the relational database engines 130.

FIG. 1B depicts an example of a list, such as list 112. The list includes at least one field, such as date field 169, requiring a query transformation. In the example of FIG. 1B, the list 112 includes a posting date column 179, and the date field 169 filters the rows of the list 112 based on the date of column 179. In this example, the user-specific field 169 of "*2010" filters the list 112 to only present sales orders with a posting date occurring anytime during the year 2010. The field 169 is transformed by the user input transformer 114. The user input transformer 114 may also perform checks as to the form of the row and/or field, such as whether the date field 169 corresponds to user specific settings (e.g., formatting, date format in month, day, year, date format in day, month year, language, units, etc.). Next, the query transformer 116 converts, based on model 118, the field "*2010" into a statement, such as a machine executable statement or an SQL statement operative at relational database engines 130. For example, the SQL statement generated by the query transformer 116 may include a query of all sales orders with a posting date of 2010, and the result set is then provided as data for the list 112 presented at FIG. 1B. In some implementations, the model 118 includes information to enable conversion of the user interface element into a query statement, such as the conversion of "*2010" into a SQL query statement. Although the previous example refers to dates and a field corresponding to filter (e.g., "*2010"), the system 100 may be used to transform other fields of a list as well.

The relational database engines 130 may be implemented as any type of database. However, in some implementations, the relational database engines 130 are implemented as an in-memory database. An in-memory database keeps most, if not all, of the relevant database data in main memory rather than disk-based storage. Examples of main memory include cache, dynamic random access memory (DRAM), static random access memory, and the like.

Figure 2:
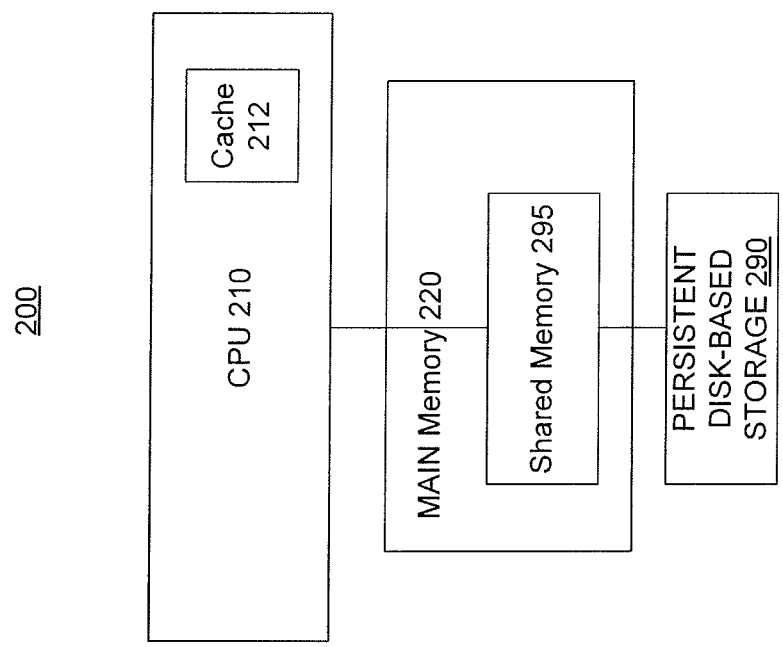
FIG. 2 depicts an example of an in memory implementation of a database.

FIG. 2 depicts a system 200 including a central processing unit 210, cache 212, main memory 220, and disk-based storage 290. In the implementation of system 200, the relational database engines 130 (e.g., the database management system application for the relational database engines 130) and the relevant data for the relational database engines 130 are primarily maintained in main memory 220. When this is the case, any queries and/or calculation performed on the data use main memory 220 rather than disk-based storage 290. In some implementations, such use of main memory 220 reduces data access latency times by at least an order of about 200. Furthermore, the application 210 may also be hosted at system 200. When that is the case, the data exchanged between application 210 and the relational database engines 130 may be via shared memory 295, which is contained within the main memory 220 used by both application 210 and the relational database engines 130.

Referring again to FIG. 1A, the relational database engines 130 may be implemented as a column-oriented database 134, although a row-oriented database 132 may be used as well. A column-oriented database refers to a database management system configured to store relevant data based on columns, not rows. On the other hand, a row-oriented database refers to a database management system configured to store relevant data based on rows, not columns.

Figure 3:
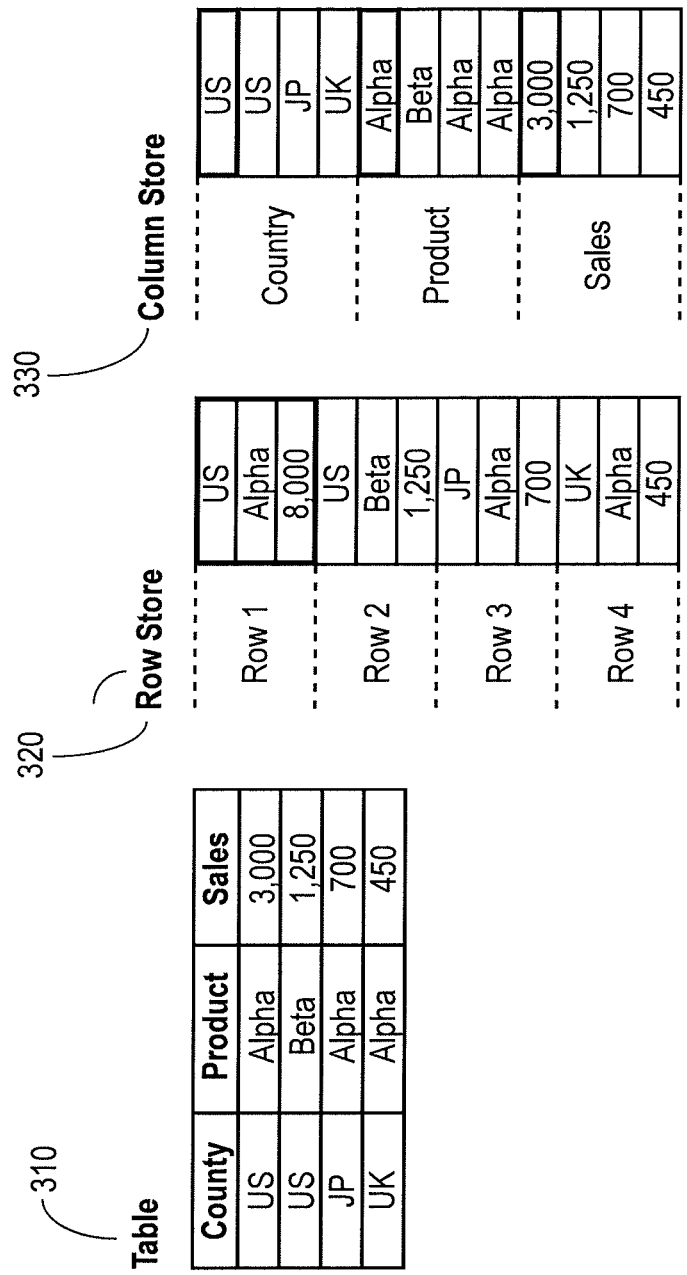
FIG. 3 depicts an example of row store and column store.

FIG. 3 depicts a table 310 including relevant data for country, product, and sales. In a row-oriented database, the relevant data is stored based on rows as depicted at row store 320; while in a column-oriented database, the relevant data is stored based on columns as depicted at column store 330.

Figure 4:
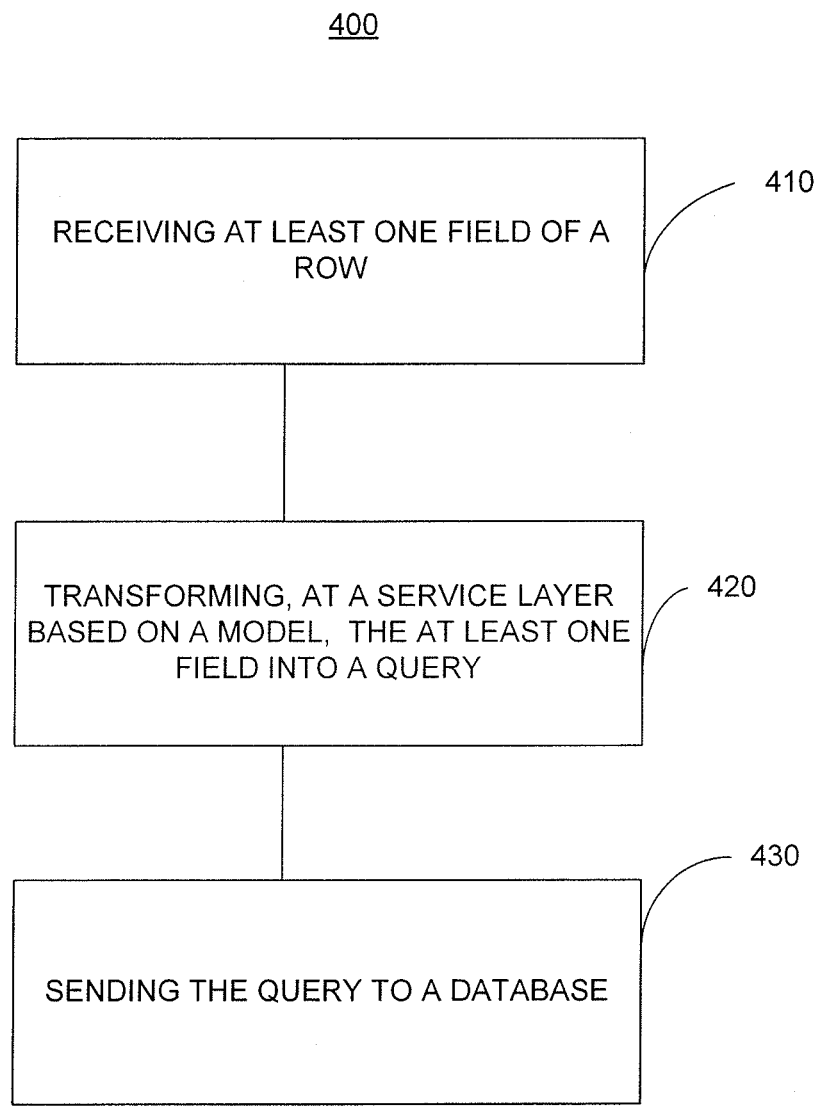
FIG. 4 depicts an example of a process for query transformation.

FIG. 4 depicts a process 400 for transforming fields of a list into a query.

At 410, at least one field of a row of a list is received. For example, user input transformer 114 may receive at least one row of list 112. Next, the user input transformer 114 may validate the form of each received row of list 112 to ensure that the row complies with a predetermined format (e.g., date format, units, user-specific configurations, and the like) and then parses from the row any fields requiring, for example, a query of database 130. For example, the field may correspond to the field "*2010" depicted at 169 at FIG. 1B.

At 420, the field parsed at 410 is transformed into a query or like action at database 130. For example, the query transformer 116 may include a model 118 configured to define how to transform a field of list 112 into a query. For example, the fields of the table 112 may be mapped, based on model 118, into database tables of the relational database engines 130, and then transformed, based on model 118, into a query statement of those database tables at the relational database engines 130. Referring again to the example of FIG. 1B, the field "*2010" may be mapped by the model 118 to tables at database 130, and the model 118 may also map "*2010" into a query for items, such as sales orders, occurring during the year 2010. The model 118 may thus enable the query transformer 116 to generate statements, such as SQL queries, of database 130 for the sales orders occurring in 2010.

At 430, the results of the query are sent to the database 130. For example, the query transformer 116 may send the query statements corresponding to the transformed field 169 to database 130 to obtain a result set. The result set provided by the database 130 is processed by the query transformer 116, the user input transformer 114, and user interface 110 to provide at least one row to list 112.

Figure 5:
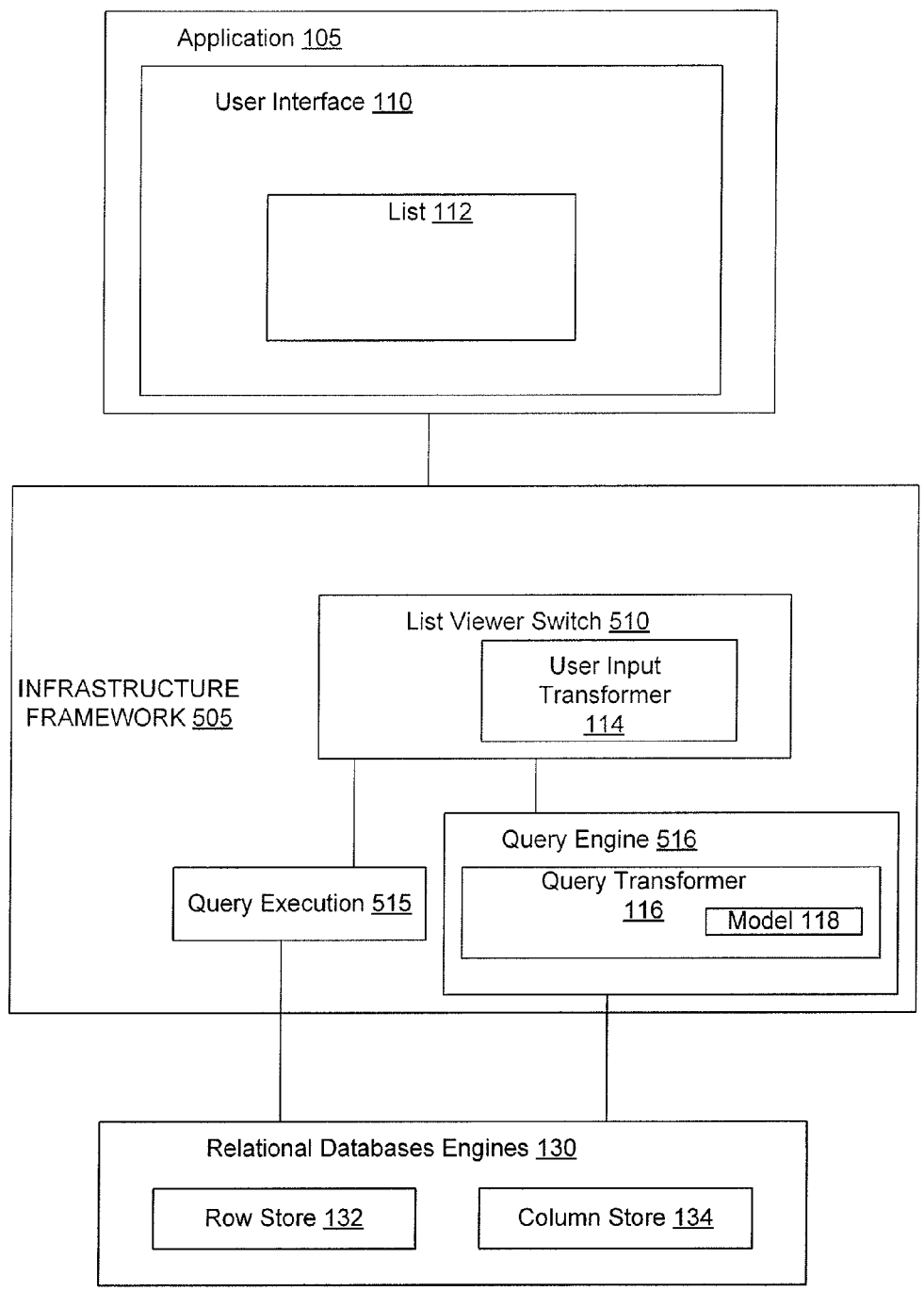
FIG. 5 depicts a block diagram of another example of a system for query transformation.

FIG. 5 depicts a system 500 which is similar to system 100 but includes an infrastructure framework 505, which includes a list viewer switch 510, a query execution component 515 and a query engine 516 (which comprises the query transformer 116 and the model 118). The infrastructure framework 505 provides a system infrastructure and may be implemented on a processor (e.g., a computer, blade, server, etc.) separate from application 105. The list view switch 510 routes commands and/or statements to either a query execution component 515 or query engine 516. For example, if a row is received from application 105, the list viewer switch 510 provides the row to user input transformer 114, which processes the row, as noted above, and provides the row to query engine 516 including query transformer 115. However, commands/statements that are not associated with rows of list 112 (e.g., an SQL statement, etc.) are routed to query execution component 515 for execution on relational database engines 130.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure a processor to perform a method, the method comprising:
    receiving, at a service component interfacing a user interface and a database, at least one field of a row of a list presented at the user interface;
    transforming, at the service component rather than the user interface, the at least one field into a query by at least parsing the at least one field, mapping the query into at least one database table at the database, and forming the query to be compatible with the database; and
    sending, by the service component, the transformed query to the database.

2. The non-transitory computer-readable medium of claim 1, wherein the at least one field further represents an action to be performed on the list.

3. The non-transitory computer-readable medium of claim 2, wherein the action includes at least one of a filtering, a selecting, a sorting, a grouping, and an aggregating.

4. The non-transitory computer-readable medium of claim 1, wherein the transforming further comprises transforming, based on a model, the at least one field into the query.

5. The non-transitory computer-readable medium of claim 1, wherein the service component is comprised separate from the user interface and the database, and wherein the service component comprises a user input transformer configured to receive the row including the at least one field and to parse the at least one field, and wherein the user interface includes a model including metadata defining the transforming.

6. The non-transitory computer-readable medium of claim 5, wherein the service component further comprises a query transformer configured to receive the parsed at least one field from the user input transformer and to generate, based on a model, a statement for execution by the database.

7. A computer-implemented method comprising:
    receiving, at a service component interfacing a user interface and a database, at least one field of a row of a list presented at the user interface;
    transforming, at the service component rather than the user interface, the at least one field into a query by at least parsing the at least one field, mapping the query into at least one database table at the database, and forming the query to be compatible with the database; and
    sending, by the service component, the transformed query to the database, wherein the service component comprises at least one processor and at least one memory.

8. The computer-implemented of claim 7, wherein the at least one field further represents an action to be performed on the list.

9. The computer-implemented method of claim 8, wherein the action includes at least one of a filtering, a querying, a selecting, a sorting, a grouping, and an aggregating.

10. The computer-implemented method of claim 7, wherein the transforming further comprises transforming, based on a model, the at least one field into the query.

11. The computer-implemented method of claim 7, wherein the service component comprises a user input transformer configured to receive the row including the at least one field and to parse the at least one field.

12. The computer-implemented method of claim 11, wherein the service component further comprises a query transformer configured to receive the parsed at least one field from the user input transformer and to generate, based on a model, a statement for execution by the database.

13. A system comprising:
at least one memory; and
at least one processor, wherein the at least one memory and the at least one processor provide operations comprising:
receiving, at a service component interfacing a user interface and a database, at least one field of a row of a list presented at the user interface;
transforming, at the service component rather than the user interface, the at least one field into a query by at least parsing the at least one field, mapping the query into at least one database table at the database, and forming the query to be compatible with the database; and
sending, by the service component, the transformed query to the database.

14. The system of claim 13, wherein the at least one field further represents an action to be performed on the list.

15. The system of claim 14, wherein the action includes at least one of a filtering, a querying, a selecting, a sorting, a grouping, and an aggregating.

16. The system of claim 13, wherein the transforming further comprises transforming, based on a model, the at least one field into the query.

17. The system of claim 13, wherein the service component comprises a user input transformer configured to receive the row including the at least one field and to parse the at least one field.

18. The system of claim 17, wherein the service component further comprises a query transformer configured to receive the parsed at least one field from the user input transformer and to generate, based on a model, a statement for execution by the database.

19. A method comprising:
receiving, at a service component interfacing a user interface and a database, a message;
determining whether the message includes a first database query command or at least one field of a row of a work list presented at the user interface;
forwarding, based on the determining, the first database query directly to the database, when the message includes the first database query command; and
transforming, at the service component, the at least one field into a second data base query command by at least parsing the at least one field, mapping the second database query command into at least one database table at the database, and forming the second database query command to be compatible with the database, when the determining results in the at least one field; and
sending, when the determining results in the at least one field, the second database query command to the database.

* * * * *